Dec. 31, 1935. G. A. ROELKE 2,025,779
DENTAL TOOL
Filed Feb. 16, 1934
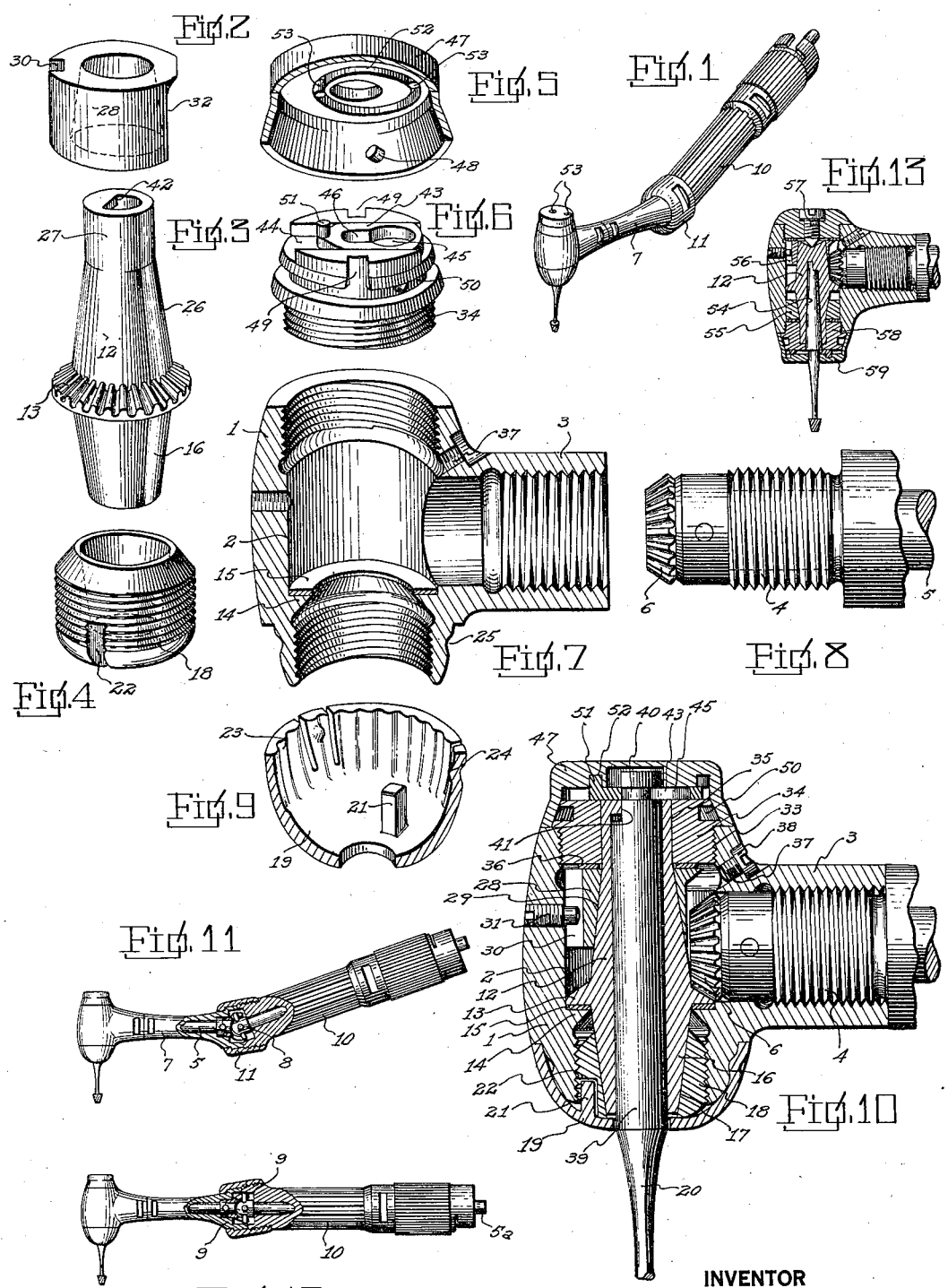
INVENTOR
Gustav A. Roelke
BY
ATTORNEY Patented Dec. 31, 1935

2,025,779

UNITED STATES PATENT OFFICE 2,025,779

DENTAL TOOL

Gustav A. Roelke, Tulsa, Okla.

Application February 16, 1934, Serial No. 711,607

12 Claims. (Cl. 32—11)

The invention relates to dental tools and has for its object to provide a device of this character wherein a double tapered burr carrying member is rotatably mounted in the tool head, and provided with adjustable tapered bearings cooperating therewith and forming means whereby as wear develops between the parts, said wear may be taken up, thereby eliminating vibration of the bearing members and burr, making a more accurate control of burr possible, hence greater precision of operation, as well as absence of unnecessary noises and chattering, which is disconcerting to the patient.

A further object is to drive the tapered burr carrying member at a point spaced from its ends and to dispose the adjustable tapered bearings within the head casing on opposite sides thereof and cooperating with oppositely tapered portions of the burr carrying member. Also to provide locking means in connection with the tapered bearings and forming means whereby the tapered bearings may be held in various adjusted positions.

A further object is to thread one of the tapered sleeves into the head casing and hold the same in position by means of a non-rotatable cap on the casing and provided with interengaging means with the threaded bushing.

A further object is to provide an annular flange within the chamber of the head and on which the gear ring of the tapered bushing rests with a shim interposed therebetween and a bushing threaded into the casing; in which one end of the burr carrying member is rotatably mounted and cooperating with a longitudinally movable tapered bearing sleeve mounted in the casing through the medium of a shim which is the means whereby wear may be taken up in the bearing members when desired.

A further object is to provide the upper end of the head with a rotatable captive member cooperating upon rotation with a slidable locking member, slidably mounted to move across the axis of the burr and cooperating with the burr for holding said burr against axial movement or for releasing said burr when desired.

A further object is to slidably mount the burr catching member in the upper bushing with the burr extending through said member and an elongated opening in the member and a lug carried by the slidable member and extending into an eccentric slot in the captive cap, whereby upon rotation of the captive cap, said burr head will be positioned into a restricted or enlarged portion of the slidable member for holding or releasing the burr.

A further object is to provide the upper bushing with vertical slots substantially 180 degrees apart, terminating at their lower ends in an annular groove in the threaded bushing and adapted to receive lugs carried by the inner periphery of the captive cap for guiding the cap during its rotation. Also to provide the cap with removable screws in the eccentric groove adapted to be replaced after the cap is placed in position to cooperate with opposite sides of the control lug carried by the slidable burr locking member for limiting the rotation of the captive cap in either direction and maintaining the cap on the tool head by preventing the registering of the lugs carried thereby with the receiving vertical slots carried by the upper threaded bushing.

A further object is to provide an adjustable handle for the tool connected thereto in a manner whereby the handle may by rotation assume a straight or an angular position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the dental tool.

Figure 2 is a perspective view of the upper tapered bearing sleeve.

Figure 3 is a perspective view of the burr carrying member and its drive gear.

Figure 4 is a perspective view of the lower tapered bearing sleeve.

Figure 5 is a perspective view of the captive cap.

Figure 6 is a perspective view of the bearing bushing for the upper end of the burr carrying member; showing the burr locking member thereon.

Figure 7 is a perspective view of one half of the tool casing.

Figure 8 is a view in side elevation of the drive pinion and a portion of the handle.

Figure 9 is a fragmentary perspective view of a portion of the lower cap and bushing locking member.

Figure 10 is a vertical longitudinal sectional view through the tool head.

Figure 11 is a side elevation, partly in section of the tool, showing the handle angularly adjusted.

Figure 12 is a view similar to Figure 11, but showing the handle sections axially adjusted.

Figure 13 is a vertical longitudinal sectional view through a modified form of head, showing adaption of tapered bearings and locking device in connection with tapered shank burrs.

Referring to the drawing, the numeral 1 designates the right angularly disposed casing head having a chamber 2 extending entirely therethrough. The head 1 is provided with an internally threaded extension portion 3 into which is threaded the threaded handle bushing 4 having a drive shaft 5 therethrough, and which drive shaft terminates in a bevelled drive gear 6, the operation of which will presently appear, however it will be noted that when the threaded sleeve 4 is in position as shown in Figure 10, the drive gear extends to a position within the casing chamber 2. Drive shaft 5 extends through the handle member 7 and terminates in female member of universal joint or gear situated within recess 9 of knuckle joint 8 of the handle member 7, and the handle member 10. It will be noted by referring to Figures 11 and 12 that the abutting ends of the handle members 7 and 10 are at angles other than a right angle to the axis of the shaft 5, and as a matter of fact ten degrees, therefore it will be seen by loosening the threaded coupling 11 connecting the handle parts, the handle member 10 may be rotated and be held at various angular positions to the axis of the shaft 5, and when rotated to the position shown in Figure 12, the handle sections are in axial relation, therefore it will be seen that the same device includes means whereby a straight or angular handle may be obtained. The drive shaft sections 5a extends through handle section 10 and carries a male member of the universal joint within recess 9 in co-relation with female member on shaft 5 and may get its source of power from any place desired and through the usual means. It will be noted that when the drive shaft sections 5a is rotated that the drive gear 6 will be rotated within the chamber 2 of the casing head 1 for driving drill carrying mechanism therein.

The burr or drill carrying mechanism comprises a burr sleeve 12 having spaced from its ends an annular gear ring 13 with which the drive gear 6 meshes, and disposed within the chamber 2 and formed integral with the wall thereof is an annular flange 14 having a shim 15 thereon, and on which shim the gear ring 13 rests. The shim is adapted to receive the wear incident to the high speed of the device, and when said shim becomes excessively worn, it may be removed and replaced for insuring the proper and substantially noiseless meshing of the gear ring 13 and the drive gear 6; therefore chattering at this point may be easily obviated. The lower end 16 of the burr sleeve 12 is tapered and has a tapered bearing 17 in a threaded bushing 18, threaded into the lower end of the chamber 2 of the head, and by adjusting the threaded bushing 18 inwardly or outwardly, wear on the bearing 17 may be accurately adjusted and taken up from time to time to prevent any play and noise in connection with the operation of the parts. After the adjusting bushing 18 is adjusted to its proper position a retaining cap 19 is placed on the lower end of the casing 1 with the burr shank 20 extending therethrough. When the cap 19 is placed in position, the lug 21 carried thereby is received in the recess 22 in the side of the bushing 18, and as the inner face of the cap is provided with ridges 23, which are adapted to interengage with ribs 24 carried by the lower casing end, it will be seen that rotation of the cap 19 is positively prevented. To prevent axial displacement of the cap 19, the inner periphery thereof is provided with struck in lugs 24, which are received within an annular groove 25 in the outer periphery of the lower end of the casing, therefore it will be seen that the cap is held against rotation and axial movement.

The upper end of the burr sleeve 12 is provided with a tapered portion 26, which terminates in a straight cylindrical portion 27, and slidably mounted within the chamber 2 is an axially movable bushing 28 having a tapered bearing 29 therein, in which the tapered portion 26 is rotatably mounted. The axially movable bushing 28 is provided with a slot 30 in one side thereof, and into which guide screw 31, threaded through the side of the casing 1, extends, thereby preventing rotation of bearing sleeve 28 during the rotation of the burr sleeve 12, but at the same time allowing axial adjustment of the bearing sleeve 28 for taking up wear on the bearing 29 as it develops. One side of the bearing sleeve 28 is recessed as shown at 32, thereby allowing the placing of the drive gear 6 in close relation to the burr sleeve and a compact structure vertically or horizontally, which will be obvious by referring to Figure 10, showing the assembled parts.

Threaded at 33 in the upper end of the casing 1 is a bushing 34, carrying the bearing 35, which is the portion 27 of the burr sleeve, rotatably mounted therein. The bushing engages a shim 36 disposed on the upper end of the bearing sleeve 28, and it will be noted that as wear occurs in bearing 28, adjustment is made by replacing shim 36 with heavier shim or adding another shim. Casing 1, where it joins the handle portion 3 is provided with a lubricant filling opening 37, normally closed by a screw 38, therefore it will be seen that lubricant can be placed within the head for lubricating the operating parts without dismantling the parts.

The burr shank 39 is preferably of the straight type as shown in Figure 10 and adjacent its upper end is provided with an annular channel 40, above the burr carrying sleeve 12 and the bushing 34. Shank 39 is provided with a flattened portion 41 which is received in the semi-circular portion 42 of the sleeve 12, and is held against rotation within the sleeve. Burr shank 39 is held against axial downward displacement by means of the diametrically slidable yoke 43, mounted in a channel 44 in the upper side of the bushing 34. Slidable yoke 43 is provided with an enlarged aperture 45, which receives the upper end of the burr shank when it is in registration with the shank aperture through the sleeve 12. After the shank 39 assumes this position, the yoke is moved to a position where the reduced portion 46 of the aperture 45 assumes a position within the channel 40 of the burr shank, therefore it will be seen that the burr shank will be positively held against axial displacement.

Mounted on the upper end of the casing 1 is a partially rotatable cap 47 which houses the upper end of the head and entirely conceals all movable parts, particularly the upper end of the burr shank which rotates in the slidable yoke, therefore there is no danger of rotating exposed parts contacting the mouth of the patient. The cap 47 is downwardly flared and is provided with diametrically disposed lugs 48 on its inner periphery which, when the cap is placed in position, pass through the diametrically disposed recesses 49 on opposite sides of the slidable yoke 43, and in the bearing bushing 34. When placing the cap in position, the yoke 43 is in open position, that is the position opposite to that shown in Figure 6.

As the cap 47 moves downwardly on the upper end of the casing with the lugs 48 in the recesses 49, and the yoke 43 in open position, the lugs 48 will enter the annular groove 50 in the bearing bushing 34 and at the same time the guide lug 51 will be received in the eccentric groove 52 within the cap 47, therefore it will be seen that upon a partial rotation of the cap 47 in one direction, the yoke 43 will be moved to closed position for holding the burr shank and when moved in the opposite direction the yoke will be moved to a position where the enlarged aperture 46 thereof will register with the shank and allow the shank to be removed. After the cap has been placed in position the stop screws 53 are threaded through the cap and extend into the eccentric channel 52 on opposite sides of the yoke lug 51, and cooperates with said lug for preventing the movement of the lugs 48 to positions where they will register with the recesses 49 in the bearing bushing 34, hence the cap will be positively held on the head.

Referring to the modified form in Figure 13, the device is particularly adapted for use in connection with tapered shank burrs 54. The sleeve 12 has the same opposite tapered portion rotatably mounted in tapered bearings 55 and 56. The end thrust of the sleeve 12 in an upward direction is taken up by an adjustable bearing screw 57 and the lower bearing bushing 58 is substantially the same as the other bearing bushing 34 in Figure 10. In this form the lower cap 59, is identical with captive cap 47, and burr retaining unit in the other views and is provided for housing the lower end of the device and through which the burr extends, otherwise the structures are the same.

From the above it will be seen that a dental tool head is provided which is simple in construction, constructed in a manner whereby all working parts are entirely housed with the exception of the burr end for drilling purposes, and means is provided involving cone shaped bearings whereby the wear on parts may be taken up, consequently noise, incident to chattering of worn parts is obviated.

It will also be seen that a positive drill-holding latching means is provided for the upper end of the shank, and that said latching means is controlled in its movement to open and closed position by a partially rotatable cap carried by the upper end of the drilling head.

The invention having been set forth what is claimed as new and useful is:

1. A dental drilling head comprising a casing, a driven burr sleeve within the casing, adjustable tapered bearing members within the casing and engaging the sleeve, a gear ring carried by the burr sleeve between the adjustable bearing sleeves, an annular flange within the casing between the adjustable bearing sleeves and on which the gear ring rests, a shim interposed between the gear ring and the annular flange for taking up end thrust, and means for locking the adjustable bearings in adjusted positions.

2. The combination with a drill head for dental purposes having a rotatable burr sleeve therein, adjustable bearings for said burr sleeve, means for moving and holding said adjustable bearings in adjusted positions, driving means for said burr sleeve, said driving means comprising a gear ring carried by the sleeve, a drive gear meshing therewith and at a right angle thereto, said drive gear extending into a recess in one side of one of the adjustable bearings, a slot carried by the side of the last named adjustable bearing in parallel relation to the axis of the adjustable bearing and a guide member carried by the casing and extending into said slot and forming means whereby said adjustable bearing is guided in its axial movement and prevented from rotation.

3. The combination with a dental tool head comprising a rotatable burr sleeve for the reception of a burr shank, a tapered lower bearing cooperating with said sleeve and threaded into the head, of a cap having interengaging locking engagement with the head and through which the burr extends and inter-engaging locking means carried by the cap and cooperating with the bearing sleeve for preventing rotation thereof.

4. A drilling head dental tool comprising a casing having a chamber therein, a rotatable burr sleeve in said chamber the upper and lower ends of said sleeve being tapered, axially adjustable tapered bearing members in the chamber and in which the tapered portions of the burr sleeve are rotatably mounted, a drive gear within the chamber, a drive gear carried by the sleeve, said driven gear having a bearing within the chamber, one end of said sleeve having a cylindrical portion, a bearing in which said cylindrical portion is rotatably mounted and within the chamber, means for holding a drill within the bearing sleeve, means carried by the burr sleeve for preventing the rotation of a burr shank therein, a latching means for said burr shank carried by the bearing member in which the cylindrical portion of the sleeve is rotatably mounted, a cap rotatably mounted on the head, said cap cooperating with said latching means for moving the same to opened or closed position.

5. The combination with a dental tool head comprising a casing, a burr carrying sleeve within the casing, a burr in the sleeve and extending above the sleeve, of a bearing bushing around the sleeve at its upper end and extending into the head, a diametrically movable latching yoke carried by the bearing member and cooperating with the burr end extending therethrough for holding said burr against axial movement and a rotatable cam carried by the head and housing the burr end and cooperating with the yoke for moving the same to open or closed positions.

6. The combination with a dental drill head comprising a casing, a burr sleeve rotatably mounted in the casing, a bearing member through which the upper end of the sleeve extends, of means for holding a burr within the sleeve with its upper end extending above the sleeve, said means comprising a slidable yoke diametrically movable in a slot in the bearing member and having an enlarged portion through which a burr shank may freely pass and a restricted portion for receiving a restricted portion of the burr shank, a rotatable cap mounted on the bearing member, said cap cooperating with the slidable yoke for moving the same to open or closed positions.

7. A device as set forth in claim 6 including a lug carried by the yoke and an eccentric groove within the cap and into which the lug extends.

8. A device as set forth in claim 6 including a lug carried by the yoke and extending into an eccentric groove in the cap and stop members in the cap groove and cooperating with opposite sides of the yoke lug for limiting the amount of rotation of the cap in opposite directions when moving the yoke to open or closed positions.

9. A device as set forth in claim 6 including lugs carried by the inner periphery of the cap, opposite recesses in the bearing member and positioned to receive the cap lugs, said bearing member having an annular channel for receiving the cap lugs after the cap is placed in position, a lug carried by the yoke and extending into an annular eccentric channel in the cap and lugs carried by the cap within the eccentric channel and cooperating with opposite sides of the yoke lug for preventing the cap lugs from again registering with the bearing recesses in the movement of the cap to open or closed positions.

10. The combination with a dental head having a rotatable burr carrying sleeve therein, a burr shank extending therethrough, a bearing member in which the sleeve is rotated, said bearing member extending above the burr sleeve and having a transverse slot therein, a burr end yoke slidably mounted in said slot, a cap housing said bearing and burr end as well as the yoke, a connection between said cap and yoke whereby said yoke may be moved to open or closed position, for releasing the burr or holding the same.

11. A device as set forth in claim 10 wherein the yoke is provided with an aperture therethrough through which the burr end will pass when the yoke is in open position and a restricted aperture through which the burr end extends when the yoke is in closed position.

12. The combination with a dental tool head having a handle member through which a drive shaft extends, of an angularly adjustable handle section carried thereby, a universal drive connection in the drive shaft where the handle sections join each other, one of said handle sections being movable to various angular positions in relation to the other section upon rotation thereof or to an axial position, said angular adjustable handle section being formed with a bearing surface at its end in a plane other than a right angle to the axis of the handle section, a second member to which the adjustable handle member is connected, said second member having an end surface at a corresponding angle to the end surface of the adjustable handle member and engaging the same, said angular engaging surfaces forming means whereby when the adjustable handle section is adjusted by rotation thereof it will assume various angular positions as well as an axial position.

GUSTAV A. ROELKE.